United States Patent Office 3,101,362
Patented Aug. 20, 1963

3,101,362
DIALKYL BETA SULFOETHANEPHOSPHONATE ALKALI METAL SALTS AND PROCESS FOR PRODUCTION
Kurt Schimmelschmidt and Walter Denk, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 11, 1958, Ser. No. 747,846
Claims priority, application Germany July 17, 1957
8 Claims. (Cl. 260—461)

The present invention relates to a process for the manufacture of new efficient wetting agents especially effective in the alkaline pH region.

When vinylphosphonic acid-bis-$\beta$-chloroethyl-ester (prepared according to the process of German Patent 1,006,414) is reacted with sodium bisulfite in an aqueous medium at temperatures in the range of 90–110° C., the sodium bisulfite is added in a smooth reaction to the double bond of the vinylphosphonic acid ester according to the following equation:

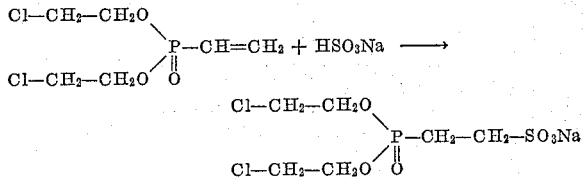

From the aqueous solution that has formed, the reaction product 2-[bis-$\beta$-chlorethyl-phosphono]-ethane-1-sulfonic acid sodium separates on cooling in the form of colorless crystal needles containing 2 mols of crystal water.

All attempts to achieve this addition reaction also with the esters of vinylphosphonic acid and higher saturated or unsaturated alcohols containing, for example, 8–10 carbon atoms, failed up to now.

Now, it has been found unexpectedly that alkali bisulfites—comprising in the instant case not only alkali metal bisulfites but also ammonium bisulfite—can be added smoothly also to these higher esters of vinylphosphonic acid, if the reaction is performed in the presence of small quantities of oxygen yielding compounds in aqueous solution at temperatures in the range of 70–120° C., preferably at a temperature between 90 and 110° C. The addition products thus obtained in a good yield constitute very efficient wetting agents which are distinguished from many other known wetting agents, especially the similarly constituted sulfosuccinic acid esters, by their better resistance in an alkaline medium and by their better fastness to boiling in alkalies or acids.

The preparation of the higher vinylphosphonic acid esters containing 8–10 carbon atoms in the alcohol group is advantageously carried out by alcoholysis of vinylphosphonic acid dichloride (cf. German Patents 1,020,019 and 1,023,034) with higher alcohols as, for example, n-octanol, n-decanol-1, 2-ethyl-hexanol-1, in inert solvents such as methylene chloride, hexane, benzene, and the like, and in the presence or even in the absence of acid binding compounds according to the following equation:

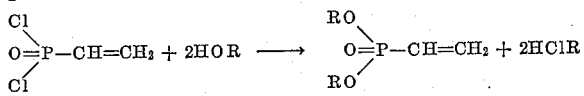

(R represents an alkyl radical having 8–10 carbon atoms.)

The reaction of these esters with the alkali bisulfites is performed in an aqueous medium and in the presence of oxygen yielding compounds at temperatures in the range of 90–110° C.

Depending on the nature of the vinylphosphonic acid ester used, the reaction is completed after 2½ to 4 hours.

From the inhomogeneous reaction product there forms at first a uniform, clearly transparent gelatin which, after evaporation of the water preferably carried out under reduced pressure, yields the 2-dialkyl-phosphono-ethane-1-sulfonic acid salts in the form of syrupy to wax-like colorless substances.

As oxygen yielding compounds there come into consideration: alkali metal persulfates, ammonium persulfates, alkali metal perborates, alkali metal percarbonates. The quantity of the oxygen yielding compounds may be chosen between 0.5 and 5% referred to the ester to be reacted. Quantities of 0.5–1% are preferably used.

If the reaction with the higher vinylphosphonic acid ester shall be performed at temperatures above 100° C., the reaction must be carried out in a closed vessel.

Amongst the alkali bisulfites used for the reaction with the higher vinylphosphonic acid ester, sodium bisulfite is the most suitable one, but ammonium bisulfite is even still usable.

The preparation of the higher vinylphosphonic acid esters serving as starting substances for the reaction according to the invention may be illustrated by the following example:

145 grams of vinylphosphonic acid dichloride are stirred at 15–20° C. in the course of 1 hour into a mixture of 600 cc. of anhydrous benzene and 260 grams of 2-ethyl-hexanol-1, and the whole is then stirred for a further 4 hours at room temperature. Upon fractional distillation under reduced pressure there are obtained 168 grams of pure vinylphosphonic acid-bis-(2-ethyl)-hexyl-ester in the form of a colorless liquid insoluble in water which has a boiling point of 108–112° C. at 0.01–0.03 mm./Hg pressure and an index of refraction $n_D^{20}$ 1.4480. The analogous reaction of the vinylphosphonic acid dichloride with n-octanol-1 or n-decanol-1, respectively, yields vinylphosphonic acid-di-n-octyl ester, a colorless liquid which has a boiling point of 147–150° C. at 0.2 mm./Hg and an index of refraction $n_D^{20}$ 1.4462, or the vinylphosphonic acid-bis-n-decyl ester, a colorless liquid which has a boiling point of 151–155° C. at 0.01–0.03 mm./Hg pressure and an index of refraction $n_D^{20}$ 1.4505. These two esters too are insoluble in water.

The following examples serve to illustrate the invention but they are not intended to limit it thereto:

EXAMPLE 1

100 grams of vinylphosphonic acid-di-n-octyl ester are intensively dispersed by vigorous stirring in 122.8 grams of sodium bisulfite solution of 27% strength and after addition of 0.6 gram of potassium persulfate the whole is stirred again for 3½ hours at 100–104° C. After this period, the originally diphase mixture has become a uniform clear gelatin. Upon elimination of the water in vacuo, there are obtained 133 grams of 2-[di-n-octyl-phosphono]-ethane-1-sulfonic acid sodium in the form of a colorless wax-like substance.

An aqueous solution of this substance of 0.01% strength reveals, compared with pure water, a reduction of the surface tension from 72 dynes/cm. to 31 dynes/cm.

The following table shows wetting values measured according to the funnel method and expressed in grams/liter having a wetting effect within 120 seconds:

Table

| | Neutral | | | Alkaline (5 g./l. NaOH) | | |
|---|---|---|---|---|---|---|
| | 20° C. | 50° C. | 70° C. | 20° C. | 50° C. | 70° C. |
| Product according to Example 1 | 0.19 | 0.16 | 0.11 | 0.38 | 0.18 | 0.13 |
| Sulfosuccinic acid ester | 0.19 | 0.16 | 0.15 | Decomposed | | |

The above table shows that no values could be obtained when sulfosuccinic acid was used as wetting agent in the alkaline region since the solution was decomposed. In contradistinction thereto, the wetting agents of the present invention gave good wetting values also in the alkaline region.

EXAMPLE 2

64.7 grams of vinylphosphonic acid-bis-n-decyl ester are reacted in the manner described in Example 1 with 68.4 grams of a sodium bisulfite solution of 27% strength and 0.6 gram of potassium persulfate. There are obtained 80 grams of 2-[bis-n-decyl-phosphono]-ethane-1-sulfonic acid sodium in the form of a colorless wax-like substance. An aqueous solution of this substance of 0.001% strength, in comparison with pure water, shows a reduction of the surface tension from 72 dynes/cm. to 31 dynes/cm.

EXAMPLE 3

130 grams of vinylphosphonic acid-bis-2-ethyl-hexyl ester are reacted in the manner described in Example 1 with 142 grams of a sodium bisulfite solution of 30% strength in the presence of 2 grams of potassium persulfate. There are obtained 161 grams of 2-[bis-2-ethyl-hexyl-phosphono]-ethane-1-sulfonic acid sodium in the form of a soft wax-like colorless substance.

An aqueous solution of this substance of 0.01% strength, in comparison with pure water, shows a reduction of the surface tension from 72 dynes/cm. to 33 dynes/cm.

We claim:

1. A process for the manufacture of wetting agents which are also effective in the alkaline region, which comprises reacting vinylphosphonic acid esters of alcohols selected from the group consisting of saturated and unsaturated alcohols containing 8–10 carbon atoms by heating said esters to 70–120° C. with alkali bisulfites in aqueous solution in the presence of oxygen yielding compounds in a quantity of between 0.5 and 5%, referred to the quantity of ester used, and selected from the group consisting of alkali metal persulfates, alkali metal perborates, alkali metal percarbonates and ammonium persulfate.

2. A process as claimed in claim 1 wherein the ester used is a vinylphosphonic acid-di-n-octyl ester.

3. A process as claimed in claim 1 wherein the ester used is a vinylphosphonic acid-bis-n-decyl ester.

4. A process as claimed in claim 1 wherein the ester used is a vinylphosphonic acid-bis-2-ethyl-hexyl ester.

5. A process as claimed in claim 1 wherein the oxygen yielding compound is potassium persulfate.

6. A process as claimed in claim 1 wherein the reaction is carried out at a temperature between 90–110° C.

7. A process as claimed in claim 1 wherein the oxygen yielding compound is used in a quantity of 0.5–1% referred to the quantity of ester used.

8. A compound of the formula

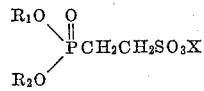

where $R_1$ and $R_2$ are alkyl radicals having 8–10 carbon atoms and X is an alkali metal ion.

References Cited in the file of this patent

UNITED STATES PATENTS

| | | |
|---|---|---|
| 2,535,172 | Tawney | Dec. 26, 1950 |
| 2,535,173 | Tawney | Dec. 26, 1950 |
| 2,535,175 | Tawney | Dec. 26, 1950 |
| 2,888,434 | Shashoua | May 26, 1959 |
| 2,965,665 | Gaertner et al. | Dec. 20, 1960 |